Dec. 8, 1925.　　　　　　　　　　　　　　　　　　1,564,522
W. J. BURKE ET AL
MACHINE FOR FINISHING THE TOE OF LASTS
Filed Jan. 10, 1923　　　2 Sheets-Sheet 1

William J. Burke
Henry G. Clausing
INVENTORS.

BY Riddle & Margeson
ATTORNEYS

Dec. 8, 1925.
W. J. BURKE ET AL
1,564,522
MACHINE FOR FINISHING THE TOE OF LASTS
Filed Jan. 10, 1923   2 Sheets-Sheet 2
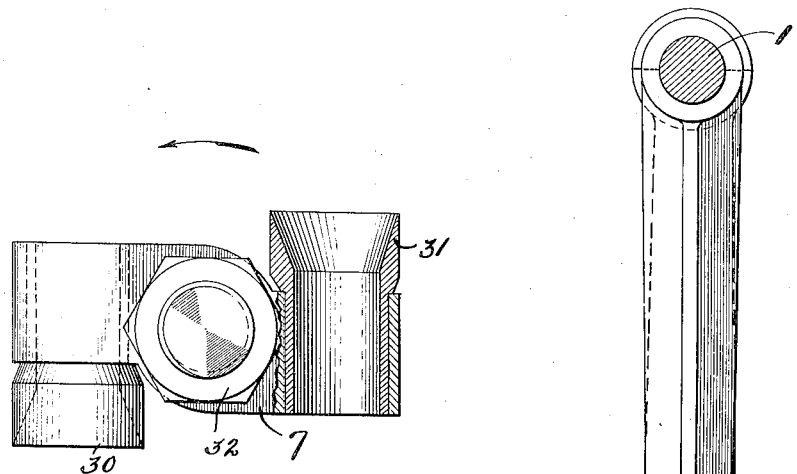
Fig.4.
Fig.2.
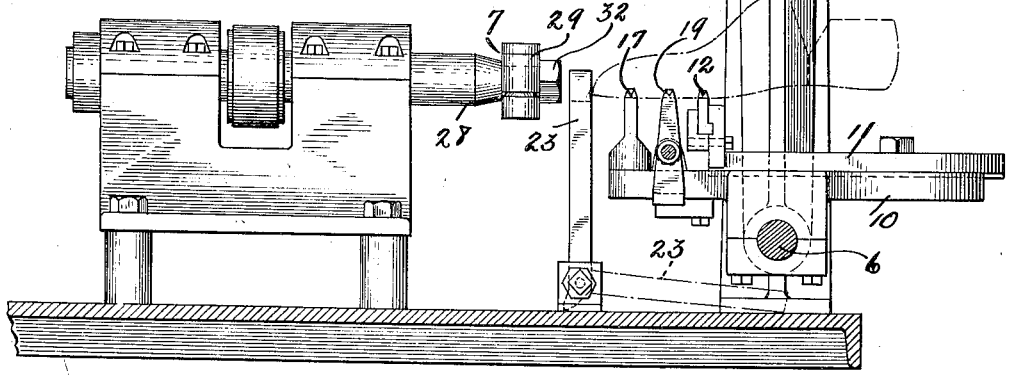
William J. Burke.
Henry J. Clausing
INVENTORS
BY Kiddle & Margeson.
ATTORNEYS.

Patented Dec. 8, 1925.

1,564,522

UNITED STATES PATENT OFFICE.

WILLIAM J. BURKE AND HENRY G. CLAUSING, OF PORTSMOUTH, OHIO.

MACHINE FOR FINISHING THE TOE OF LASTS.

Application filed January 10, 1923. Serial No. 611,834.

*To all whom it may concern:*

Be it known that we, WILLIAM J. BURKE and HENRY G. CLAUSING, citizens of the United States, and residents of the city of Portsmouth, county of Scioto, and State of Ohio, have invented certain new and useful Improvements in Machines for Finishing the Toe of Lasts, of which the following is a specification.

Our invention relates to an improvement in last-finishing machines and particularly to machines for finishing the toes of hinged or jointed wooden lasts.

In the present construction we have provided a machine in which the last to be finished and a model last are mounted in a chuck which is so constructed and arranged that the last can be given the movement necessary to enable it to be brought into contact with a cutter and finished, and wherein the last is engaged by the chuck between the hinge or joint and the toe of the last.

Specifically we provide a chuck or fixture for holding the model and the last to be finished, this chuck being slidably and rotatably mounted on a rod extending across the front of the machine and carried in a pair of hangers to enable the chuck to be swung toward and from a cutter for trimming the last and a guide wheel for following the model last.

By mounting the chuck so as to enable it to be swung with the hangers and to be adjusted on its supporting rod, all parts of the toe of the last may be reached by the cutter and finished.

In addition to these details of construction we also provide a guide or stop for properly adjusting the last and model in the chuck at the beginning of the finishing operation, so that they will be positioned properly with respect to each other.

In the accompanying drawings,—

Fig. 2 is a section on line 2—2 of Fig. 1;

Fig. 4 is an enlarged view of the improved cutter which we employ in finishing the lasts.

Figure 1:
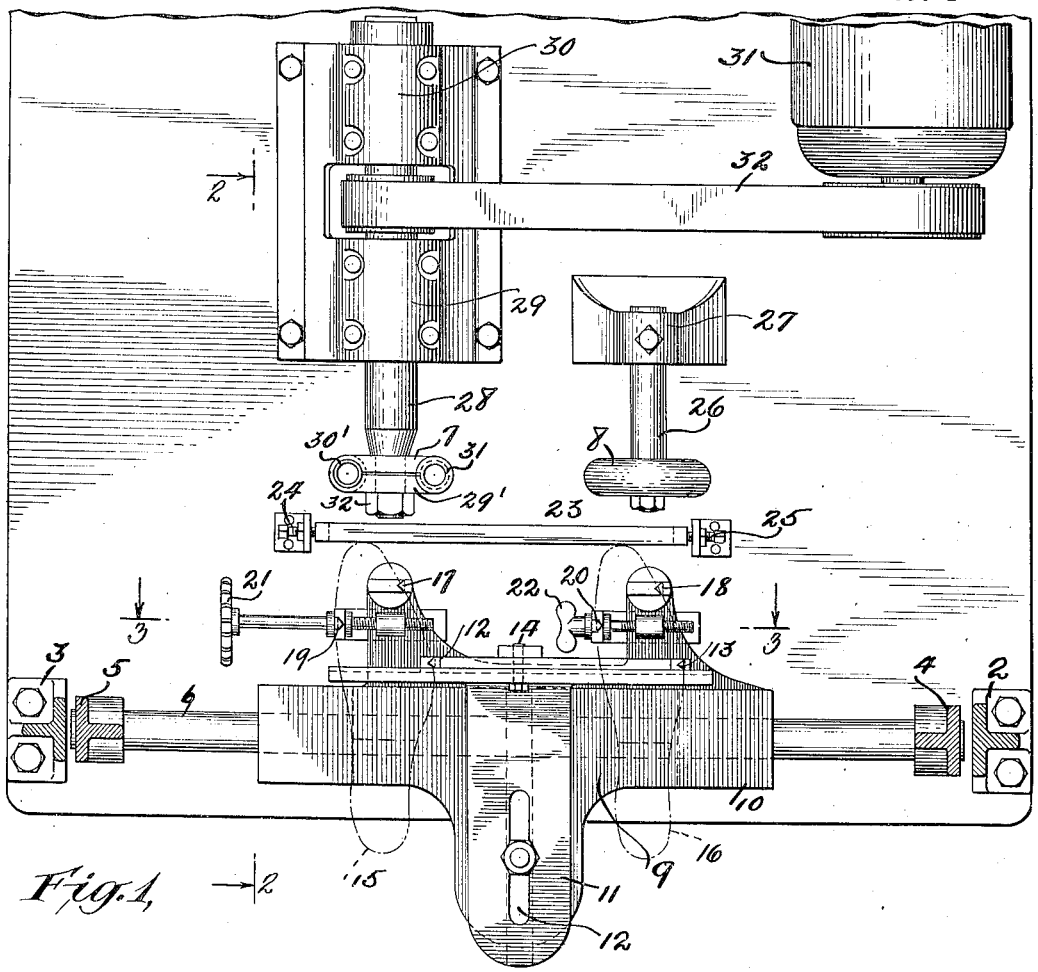
Fig. 1 shows an embodiment of our invention in plan.
Figure 3:
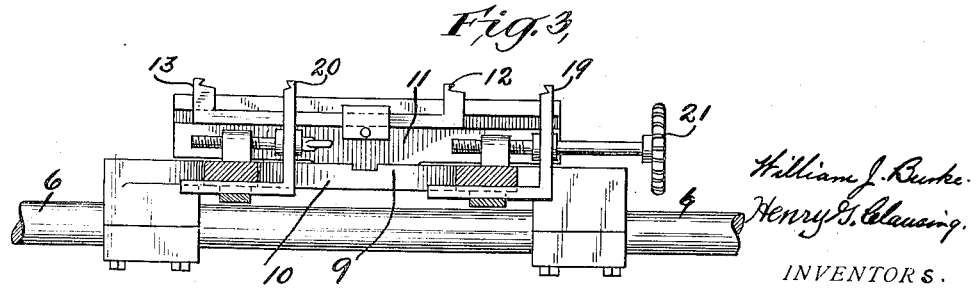
Fig. 3 is a section taken substantially on the line 3—3 of Fig. 1.

Referring to the drawings in detail, numeral 1 designates a rod supported in any suitable manner in uprights 2 and 3 this rod carrying a pair of hangers designated 4 and 5. Supported by the lower end of these hangers is a chuck supporting rod 6, this rod extending across the front of the machine as will be seen from Fig. 1 and lying parallel to the faces of a cutter 7 and guide wheel 8.

The chuck-supporting rod 6 carries a chuck designated 9 and comprising a bed plate 10 on which is slidably mounted a chuck slide 11, this slide being provided with a slot 12 extending transversely of the axis of the chuck supporting rod 6 and receiving a bolt passing through the bed plate 10 so that the slide may be adjusted toward and away from the cutter and guide wheel. The chuck slide carries a pair of clamping jaws designated 12 and 13, these clamp jaws being secured to the slide by a bolt 14 so that the jaws may be adjusted to the right or left as viewed in Fig. 1 along a line parallel to the axis of the rod 6. The jaws 12 and 13 are provided for the purpose of engaging the outside edge of a last 15 and model last 16, and as will be apparent from the description thus far given may be adjusted in two directions, to wit, laterally and longitudinally.

The bed plate 10 of the chuck carries at its inner end a pair of fixed jaws 17 and 18 for engaging the outer edge of the last 15 and model 16 at a point beyond the point engaged by the edges of the jaws 12 and 13. At the inside of the last and model we provide a pair of movable jaws 19 and 20, these jaws engaging the last and model at a point approximately midway between the points engaged by the jaws 12 and 17, and 13 and 18. The jaws 19 and 20 are adjustable to enable the desired clamping action to be brought on the last and model, this adjustment being effected by hand wheel 21 and thumb screw 22.

It will be seen therefore that the last 15 and model 16 are supported upon the chuck 9 and held in place thereon by the jaws 12, 17, 19 and 13, 18, 20, respectively, the chuck engaging the last between the hinge or joint of the last and the toe, and inasmuch as the chuck as a unit is rotatably mounted on the rod 6 and movable axially thereof, and inasmuch as the rod 6 and chuck may be rocked with the hangers 4 and 5 in the bearings in the brackets 2 and 3 the last and model may be moved to any position desired without removal from the chuck.

In order that the last and model may be properly positioned relatively to each other in the chuck we provide a stop or guide member designated 23. This stop or guide which is rectangular in plan is pivoted at 24 and 25 and when not in use may be collapsed into the dotted line position shown in Fig. 2. When in use this member is raised to the position shown in full lines in Fig. 2 and the last and model may be moved forward until the toe of each abuts the face of the stop. The clamps 19 and 20 may then be tightened to force the lasts against the jaws 12, 17, and 13, 18, so to clamp the last and model securely in position on the chuck.

The guide wheel 8 is mounted for rotation on a short shaft 26 mounted in a suitable bearing 27 on the bed of the machine, while the cutter 7 is carried by a shaft 28 mounted also on the bed of the machine in bearings 29 and 30. This cutter may be driven by an electric motor 31, for example, through a belt 32. The cutter and guide wheel are in horizontal alinement with each other and these two members are of the same diameter so that when the toe of the model 16 is brought into contact with the guide wheel 8 and moved about this wheel the toe of the last 15 will be cut away to exactly duplicate the toe of the model.

The cutter 7 is of an improved construction and comprises a split chuck 29' adapted to receive and hold a pair of hollow cutters 30' and 31 these cutters lying parallel to each other and extending in opposite directions so that the cutting edge of one or the other of said cutters will always be active. The cutter chuck is caused to grip the cutters by a nut 32 which is screwed on the end of the shaft 28 and engages the face of the chuck so that when this nut is turned down the chuck will be tightened to firmly hold the cutters. This cutter is particularly well adapted for finishing lasts, the hollow construction effectually preventing jamming of the cutter by the chips from the last, and by turning the cutters around in the cutter chuck from time to time a good cutting edge is always presented to the face of the last being finished so as to insure a good clean cut at all times.

It will be seen from the foregoing that in operation the hangers 4 and 5 together with the chuck 9 may be moved to the right as viewed in Fig. 2 and the stop or guide 23 moved from the dotted line position to the full line position of Fig. 2. The chuck 9 is then allowed to assume a horizontal position and the model 16 applied thereto and clamped in place, the front or toe of the model lying in engagement with the face of the guide or stop 23. The last to be finished is then placed in the chuck and moved forward until its toe also engages the guide or stop 23 after which the last may be tightened.

The last and model are now clamped in position in the chuck with their ends equally spaced from the cutter 7 and guide wheel 8, and inasmuch as the cutter and guide wheel are in horizontal alinement with their faces in the same plane, and inasmuch as the distance between the points of engagement of corresponding jaws on the last and model is equal to the distance between the centers of the cutter and guide wheel it will be seen that the last must finish off to an exact duplicate of the model.

It will be seen from the foregoing that our apparatus is capable of being manipulated so as to enable the toe part of a last to be finished to exactly duplicate the toe of a model and after the model is once suitably clamped in the chuck 9 as many lasts may be finished to duplicate this model as is desired, it being necessary merely to remove the lasts as finished and replace them with unfinished lasts, this being effected by operation of the hand wheel 21.

It will be seen also that the jaws 12 and 13 may be moved either to the left or to the right as desired as viewed in Fig. 1 to accommodate or adjust the chuck to lasts of varying widths, and as these jaws may be adjusted lengthwise of the model and last as well the chuck will accommodate lasts of varying lengths also.

We claim:—

1. In a machine of the class described, a chuck for holding a last and a model, jaws adjustably mounted on said chuck, said jaws being spaced a fixed distance from each other, one of said jaws engaging a portion of the last and the other a portion of the model, a pair of fixed jaws also carried by said chuck one of said fixed jaws engaging the last and the other the model and a pair of movable clamping jaws carried by said chuck and movable into and out of last and model engaging positions, said last named jaws engaging the last and the model on the side opposite to the jaws first mentioned.

2. In a machine of the class described a chuck for holding a last and a model, a guide or stop, a cutter and a guide wheel for cooperating with the last and the model, respectively, said guide lying parallel to the said cutter and guide wheel, said chuck being movable to bring a last and a model carried thereby into simultaneous engagement with the face of said guide so that the toe of the last and the model will be in alinement with each other and parallel to the faces of said cutter and guide wheel.

This specification signed this 30 day of December 1922.

WILLIAM J. BURKE.
HENRY G. CLAUSING.